United States Patent
Takai

[19]

[11] Patent Number: 6,116,908
[45] Date of Patent: Sep. 12, 2000

[54] DANCE TRAINING DEVICE

[76] Inventor: Gunzo Takai, 3-25-32, Ohkubo, Konan-ku, Yokohama-shi, Kanagawa, Japan

[21] Appl. No.: 09/263,613

[22] Filed: Mar. 5, 1999

[30] Foreign Application Priority Data

Mar. 9, 1998 [JP] Japan ................... 10-057083

[51] Int. Cl.⁷ .................................. A63B 69/00
[52] U.S. Cl. .......................... 434/250; 434/247
[58] Field of Search .................. 434/250, 297, 434/255, 256

[56] References Cited

U.S. PATENT DOCUMENTS

| | | | |
|---|---|---|---|
| 2,871,580 | 2/1959 | Samdahl | 434/250 |
| 2,913,835 | 11/1959 | Montine | 434/250 |
| 2,988,825 | 6/1961 | Wilson | 434/250 |
| 4,735,572 | 4/1988 | Clifford | 434/250 X |

Primary Examiner—Sam Rimell
Attorney, Agent, or Firm—Ostrolenk, Faber, Gerb & Soffen, LLP

[57] ABSTRACT

A device is provided which permits the user to learn to dance without substantial need to concentrate on understanding the order of foot positions from a complex diagram, but rather by immediately understanding the foot positions, thus permitting the user to focus his/her concentration on learning the foot positions and resulting in efficient dance instruction. The device includes a progress controller 1 formed as a microprocessor or the like, a display such as a liquid crystal display, a mode setter 2 constructed as a track pad and also icons, buttons and a list displayed on the screen of the display 6. The hardware of the device can be embodied as a light-weight notebook-type personal computer of about A5-type. The progress controller 1 reads foot position data of a figure selected by a figure selection switch c of the mode setter 2 from a figure memory M2, reads a foot position pattern represented by the foot position data from the foot position memory M1, and supplies the foot position data to the display 6 for display on the display screen. Also, the progress controller 1 reads a still or moving image of a dance from a still or moving image memory M4 and M5 and displays the data in superimposition over the foot positions.

14 Claims, 14 Drawing Sheets

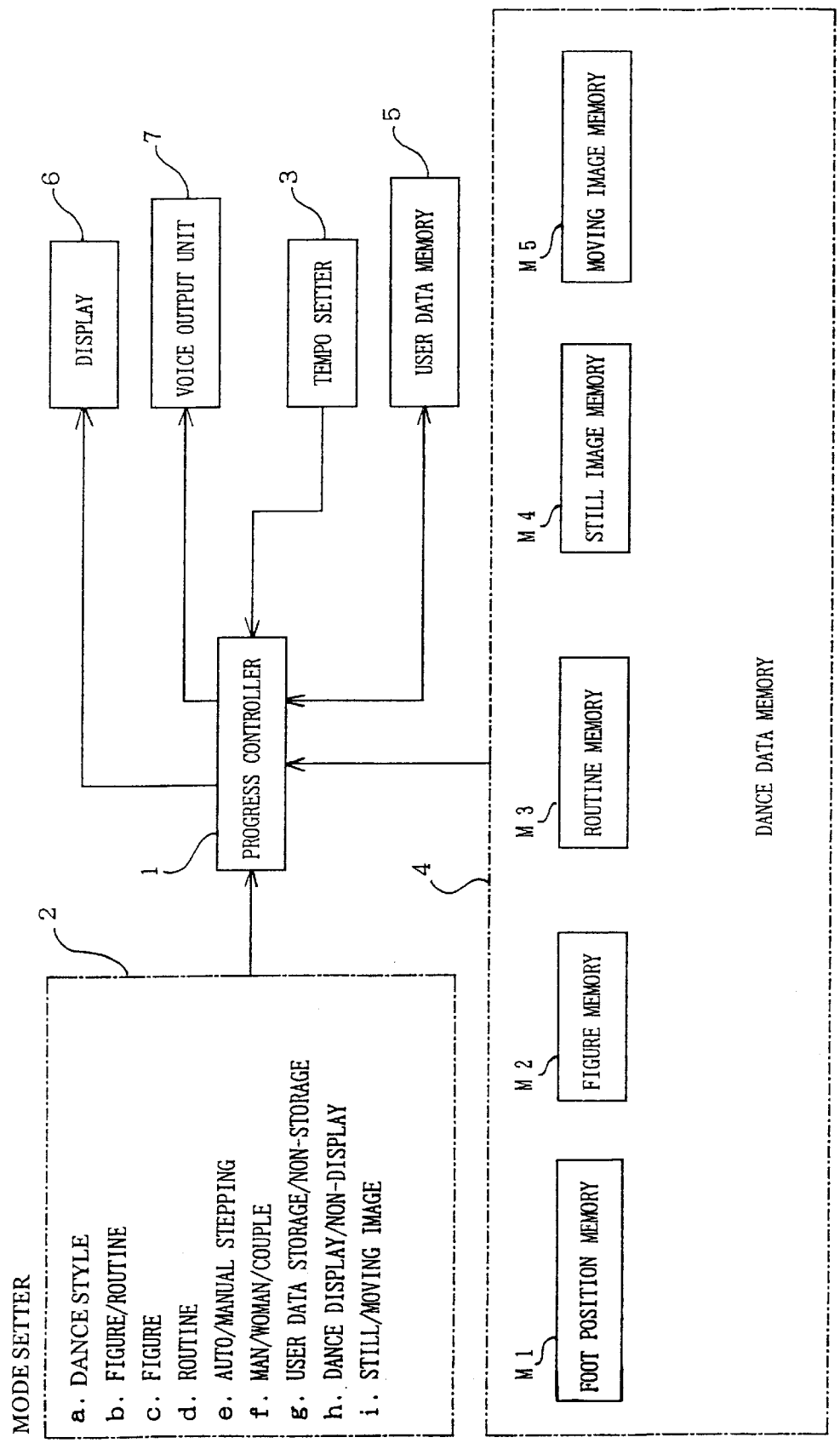

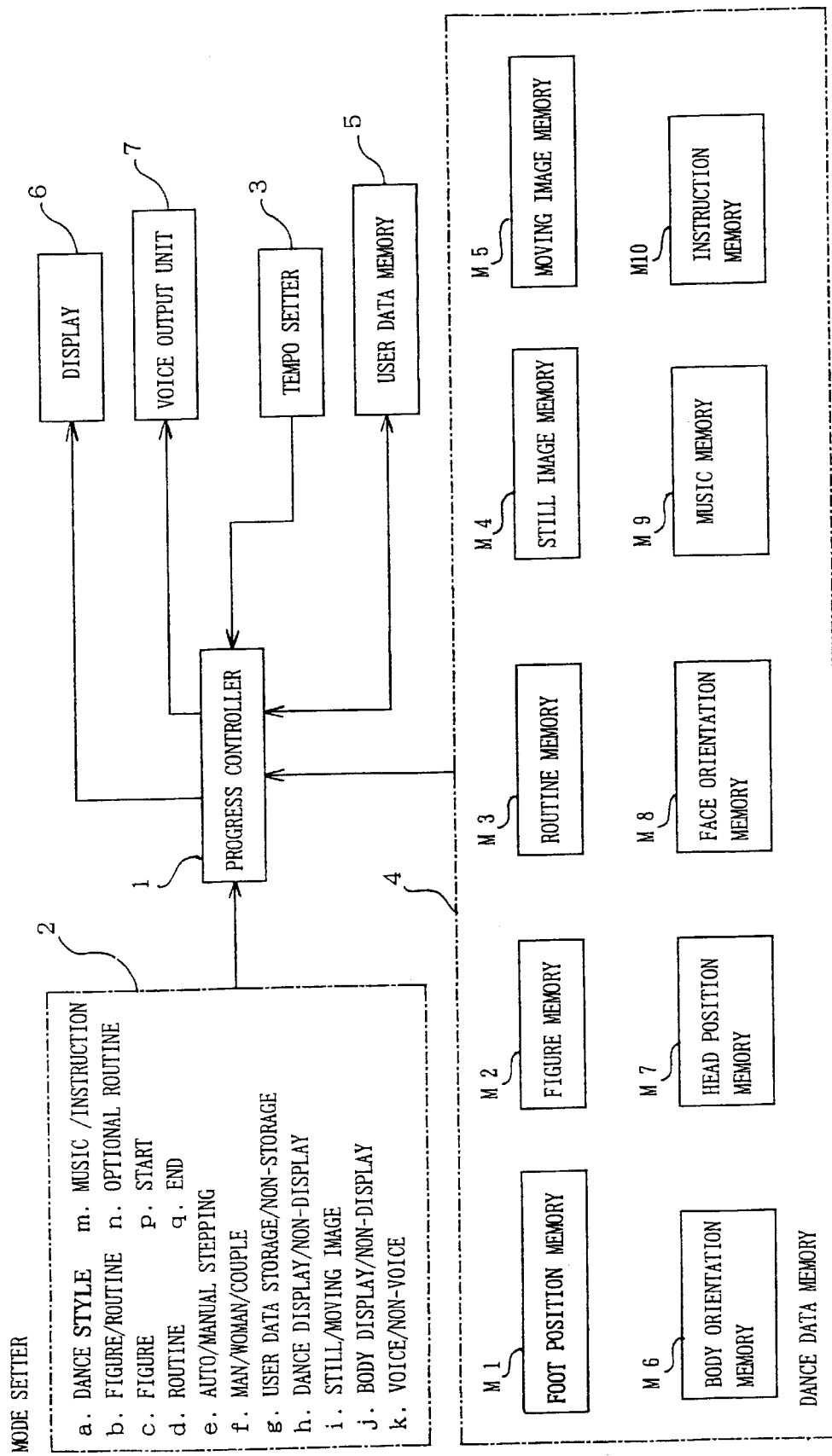

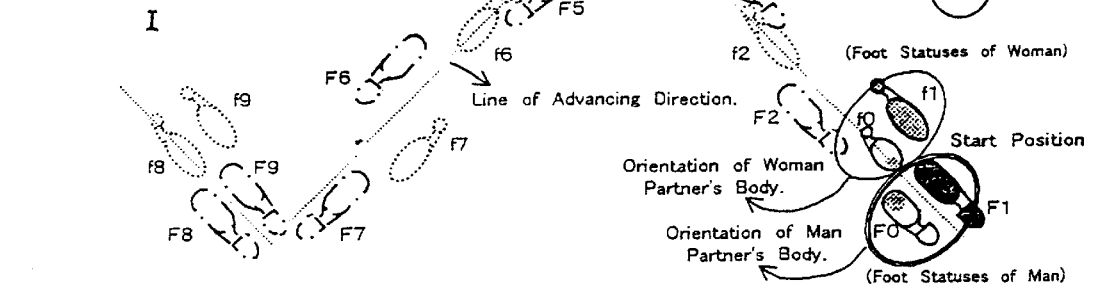
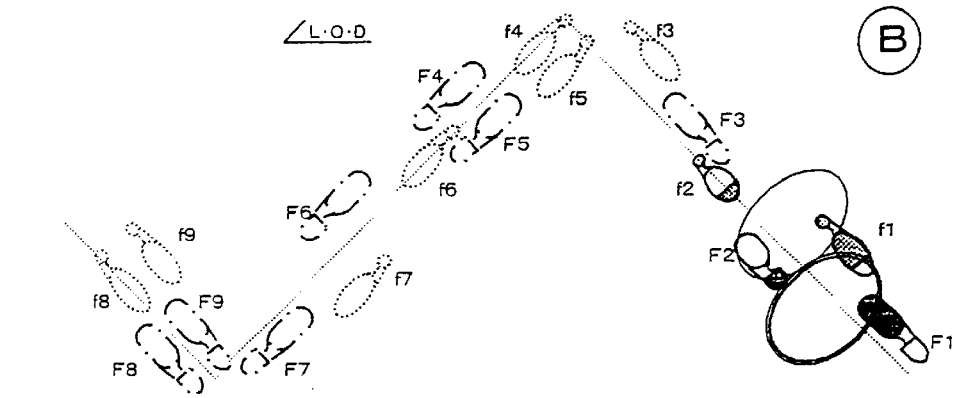
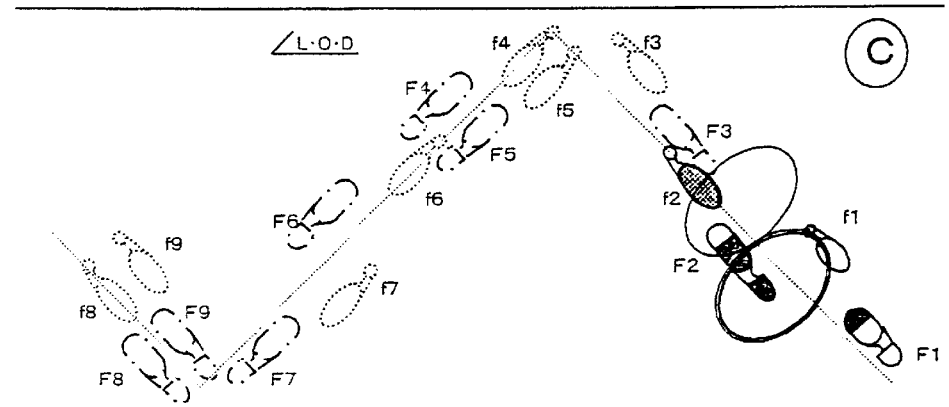
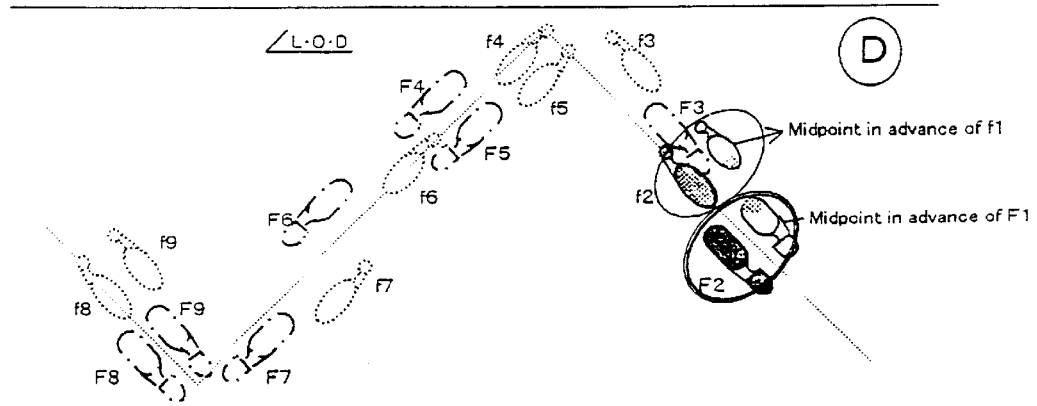
FIG.3 [EXAMPLE] Quarter Turns of Blues I

FIG. 4
「EXAMPLE」 Quarter Turns of Blues
II
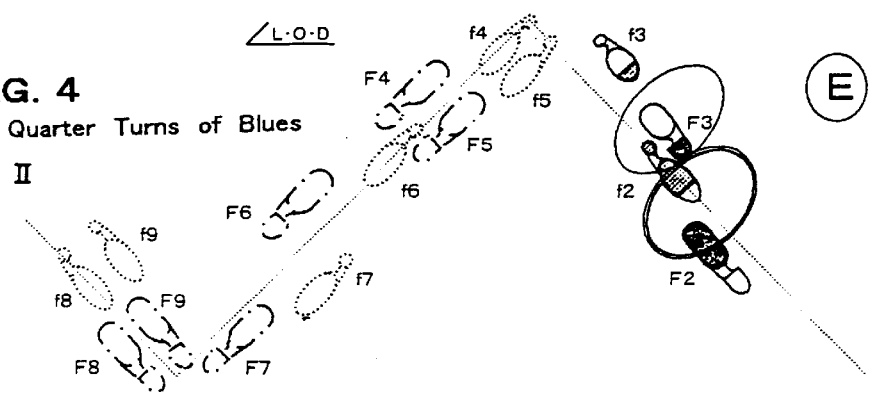
(E)
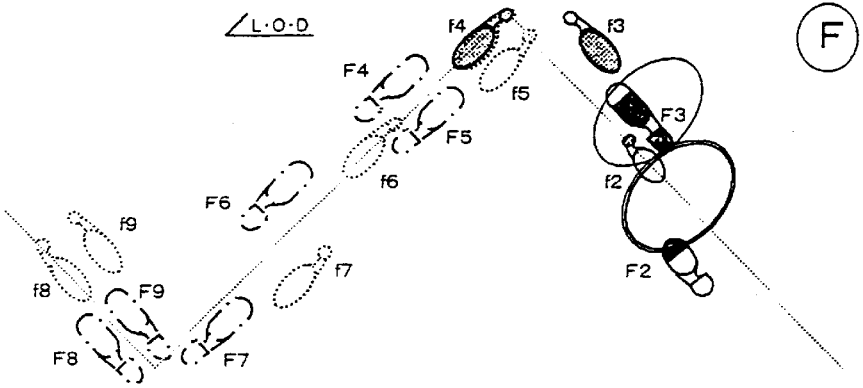
(F)
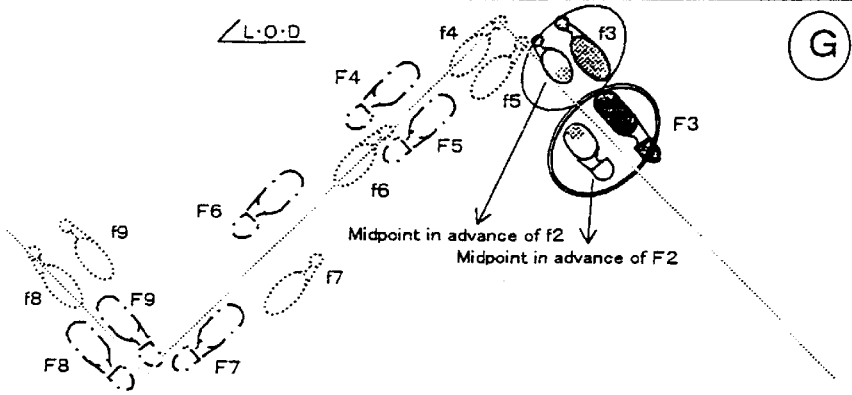
Midpoint in advance of f2
Midpoint in advance of F2
(G)
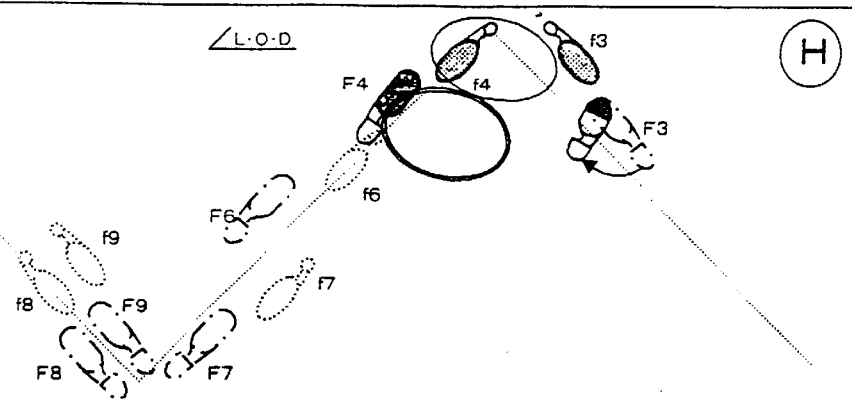
(H)

FIG. 5
「EXAMPLE」 Quarter Turns of Blues
III
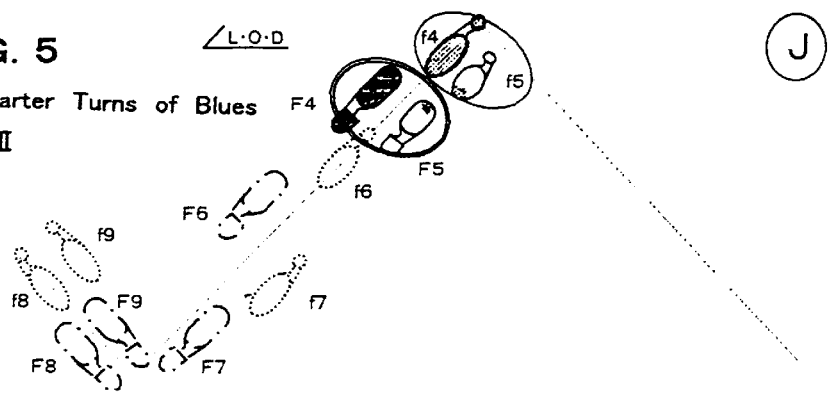
(J)
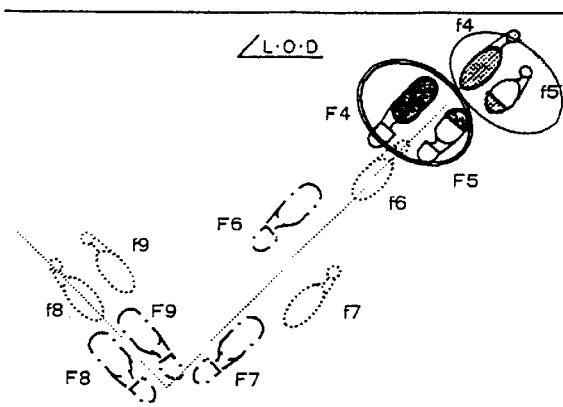
(K)
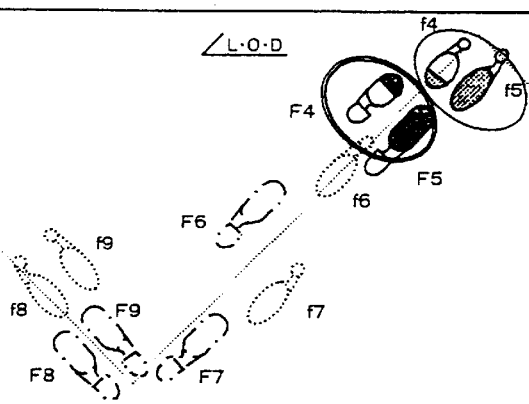
(L)
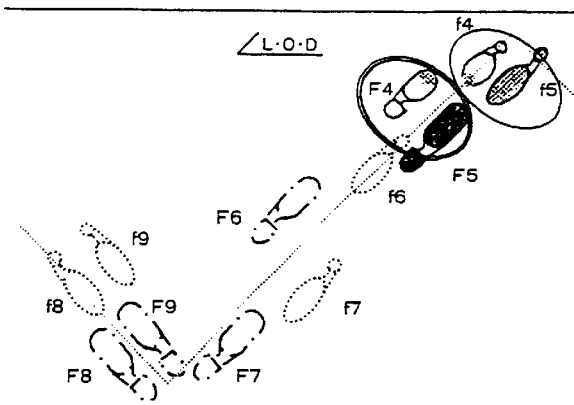
(M)

FIG. 6
「EXAMPLE」 Quarter Turns of Blues
IV
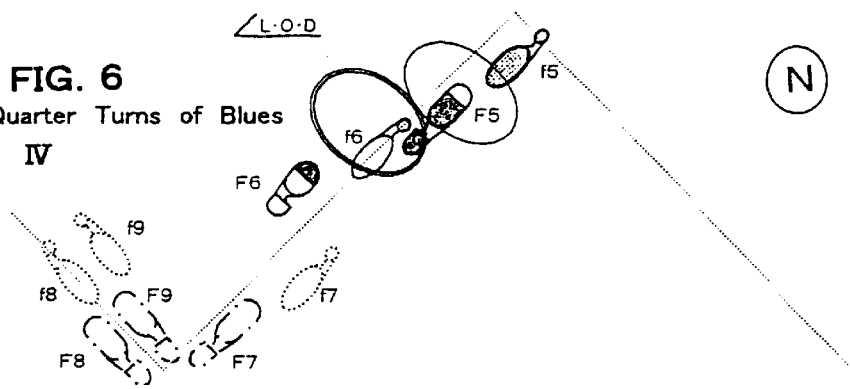
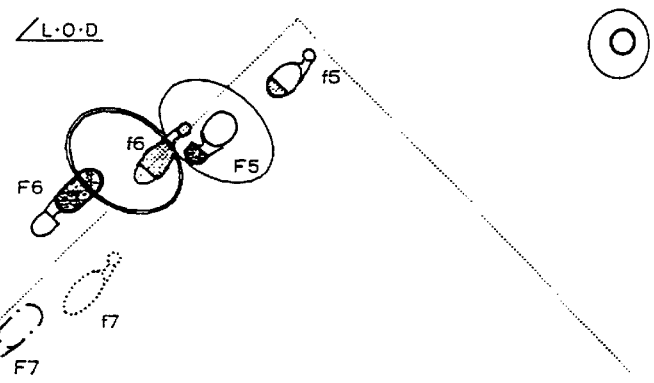
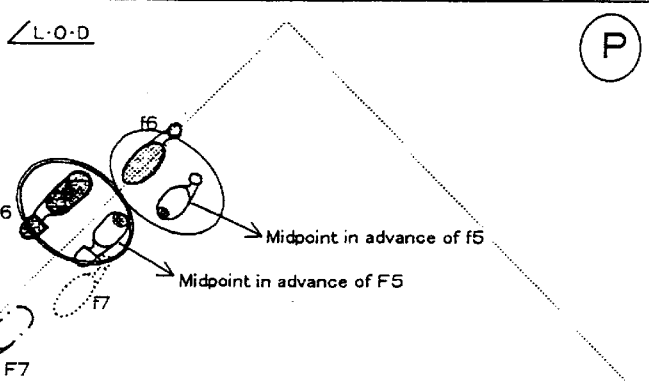
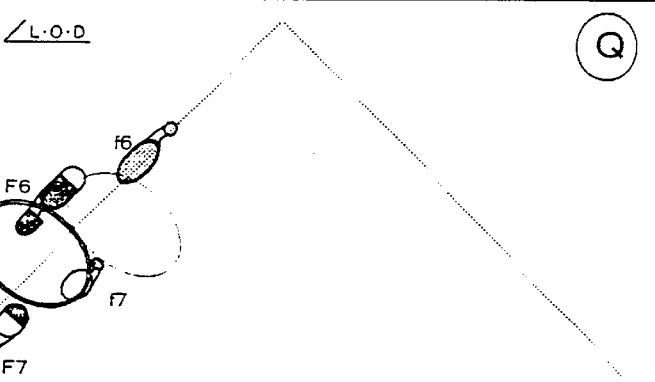

FIG. 7
∠L·O·D  Ⓡ
「EXAMPLE」 Quarter Turns of Blues V
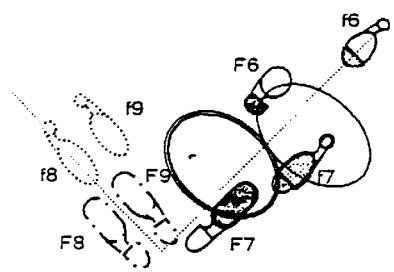
∠L·O·D  Ⓢ
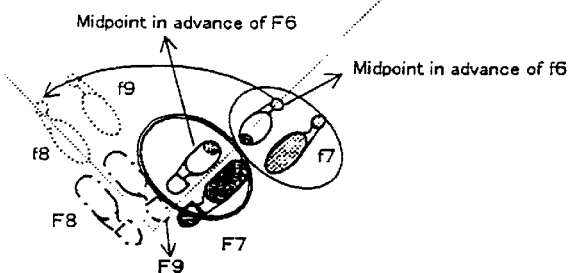
Midpoint in advance of F6
Midpoint in advance of f6
∠L·O·D  Ⓣ
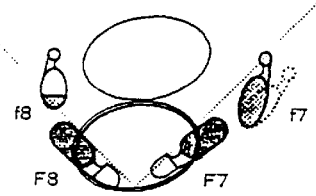
∠L·O·D  Ⓤ
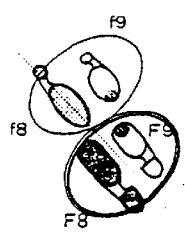

「EXAMPLE」 Quarter Turns of Blues VI

FIG. 10 PRIOR ART
「EXAMPLE」 Side Chasse to Right in Blues
(Example of Figure Suited For Selection Subsequent to Quarter Turns)
Note: In Dance Guide Books the Movement of Foot Positions is Explained by Using Many Arrows and Numbers Such as Those Shown
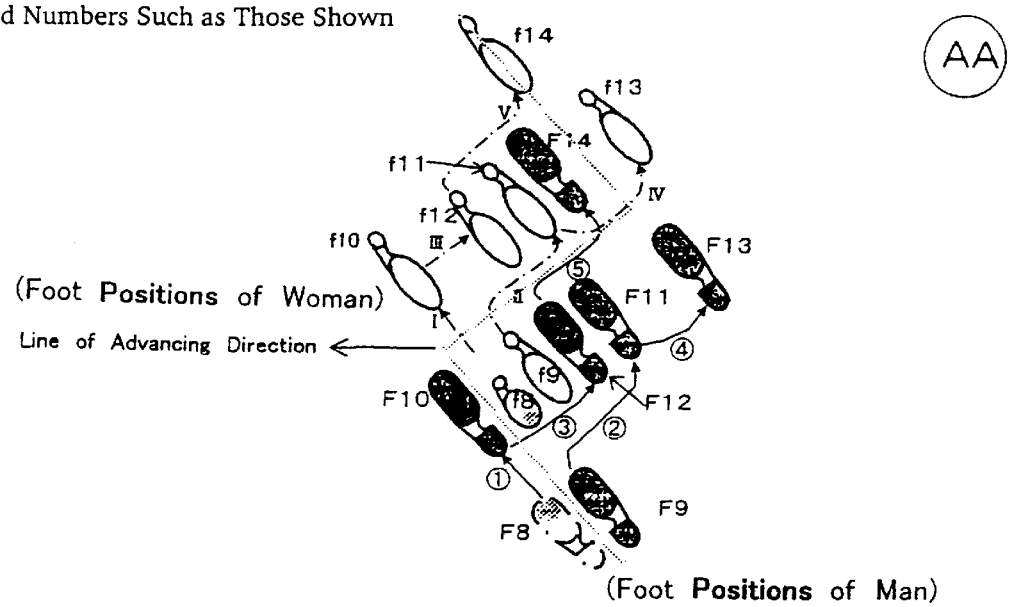
(AA)
「EXAMPLE」 First Half of Natural Turn (1-4 steps) of Blues
(Example of Figure Suited For Selection Subsequent to Quarter Turns)
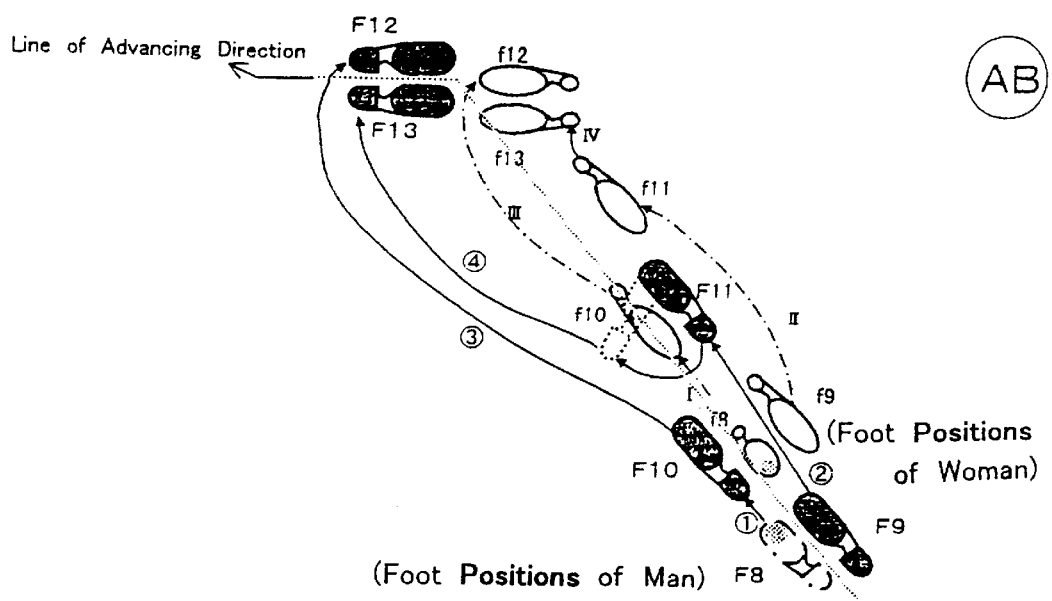
(AB)

* Part of Flow Chart When Providing Voice and Also When Displaying and Not Displaying Body

DANCE TRAINING DEVICE

BACKGROUND OF THE INVENTION

The present invention relates to a dance training device with a liquid crystal or like display and, more particularly, to a portable dance training device, which permits dance training by carrying it and watching foot statuses of successive dance steps automatically displayed on the display screen.

Dance has heretofore been trained with reference to dance primers or training books and also taught by showing contents of such books. Dance training book spare many pages for the illustration of foot statuses of figures. A figure means a combination of fixed steps. A certain dance guide book defines the figure as "a fixed form of a logical combination of movements of two or more steps". A step means one movement of a foot.

There are many kinds of dances, such as blues, tango and waltz. Each kind of dances includes various movements from an overall view, but the overall dance movement consists of a combination of a plurality of figures. The overall dance movement, for instance one excursion on the dance floor, is called a routine. A routine is a combination of a plurality of successive figures.

FIG. 9 shows a routine example, i.e., a well-known blues routine. This routine consists of a succession, from the illustrated start point, of 13 figures, i.e., quarter turns, quarter turns, side chasse to right, quarter turns, check back, quarter turns, natural pivot turn, quarter turn to left, quarter turns, natural turn, quarter turns and check back.

As shown in FIG. 9, a routine is usually shown as a trace of the center position of a couple of a man and a woman partner. Indicated as L.O.D. is the abbreviation of line of dance. The L.O.D. is directed in the counterclockwise direction in the dance hall (usually and hereinafter referred to as floor), and its direction is changed at the corner of a rectangular floor. Black circle marks in the Figure represent figure connection points.

Figures are selected in dependence on the shape of the floor, the tempo of the dance music, the skilled level or taste of the dancers and so forth. However, some figures are suitably selectable subsequent to a certain figure, and others are not. The dance will be rhythmical or awkward depending on the figure selection. It depends on the dancer's skilled level what figures are to be selected to form a routine and make the dance pleasant and beautiful.

In the prior art dance guide book, figures are illustrated in the manner as shown in FIG. 10. Shown in AA in the Figure are foot statuses of side chasse to right as a blues figure. The man partner's foot statuses are designated by symbols F8 to F14, and the movement directions of the steps are indicated by arrows. The successive step movements are indicated by numeral FIGS. 1 to 5 enclosed in circles. The woman partner's foot statuses are illustrated likewise.

As is seen from the figure foot status example shown in FIG. 10, in the prior art figure illustration method a number of foot statuses are shown in the same color, in the same form and on the same paper, and to permit sequential tredding as in these foot statuses the foot movement direction for each step is indicated by an arrow, while also indicating the foot movement sequence by successive numeral figures. Such foot statuses, arrows and figures are shown in a very intricate fashion on a single paper sheet. In order to make tredding of the sequential steps in accordance with the figure foot status view, therefore, it is necessary to rely on the sight and make step-by-step selection, for the moment, of only the necessary one of a number of expressions of the foot statuses, arrows and numeral figures.

However, it is extremely difficult to continuously maintain such concentration. Although those who brought a dance guide book may try the training for a while, mostly they will soon give up and do not master and enjoy dance. For this reason, the prior art dance guide books were only used by dance teachers as a very auxiliary material for teaching dance.

SUMMARY OF THE INVENTION

An object of the invention, accordingly, is to provide a dance training device, which permits the user to readily understand training data such as figure foot statuses displayed in the dance training and select necessary training data in dependence on his or her skilled level attained by the training and also taste.

According to a first aspect of the present invention, there is provided a dance training device comprising: a progress controller including a microprocessor and a memory for inputting and outputting data from and to the microprocessor for controlling the progress of dance training; a display constituted by a liquid crystal display or the like for displaying foot status data or the like supplied from the progress controller on a screen; mode setter including means for generating such select switch as irons, buttons or a list to be displayed on the screen, means for generating a pointer for giving a designation to the select switch, and manual command/designation input means constituted by a pointing device for manually receiving movement command of the pointer and the designation or a mode setting device constituted by a miniature switch or like hardware switch for receiving a manually inputted dance training mode; and a dance data memory constituted by a semiconductor memory or the like for storing such dance data as foot status or figure data to be displayed for dance training on the screen or data utilized for generating data to be displayed on the screen in the progress controller; the progress controller reading out dance data from the dance data memory according to a dance training mode set in the mode setter, and supplying the dance data read out from the dance data memory or the data generated from the dance data red out from the dance data memory according to the dance training mode set in the mode setter.

Other objects and features will be clarified from the following description with reference to attached drawings.

BRIEF DESCRIPTION OF THE DRAWINGS

FIG. 1 is a block diagram showing an embodiment of the invention;

FIG. 2 is a block diagram showing a different embodiment of the invention;

FIG. 3 is a view showing an example of foot status images sequentially displayed on a display 6 of the first embodiment in the case of selection of blues with a dance mode select switch and selection of quarter turns with a figure select switch;

FIG. 4 is a view showing foot status images sequentially displayed subsequent to the images shown in FIG. 3 in the case of the selection of blues with the dance mode select switch and the selection of quarter turns with the figure select switch;

FIG. 5 is a view showing foot status images sequentially displayed subsequent to the images shown in FIG. 4 in the case of the selection of blues with the dance mode select switch and the selection of quarter figures with the figure select switch, the status being a case where feet of man and woman are placed on the floor without loading their weight to the floor;

FIG. 6 is a view showing foot status images sequentially displayed subsequent to the images shown in FIG. 5 in the case of the selection of blues with the dance mode select switch and the selection of quarter turns with the figure select switch;

FIG. 7 is a view showing a foot status images sequentially displayed subsequent to the images shown in FIG. 6 in the case of the selection of blues with the dance mode select switch and the selection of quarter turns with the figure select switch;

FIG. 10 is a view showing foot statuses of figure examples suited to be selected when blues quarter turns selected with the figure select switch has been ended, AA showing the foot statuses of side chasse to right, AB showing the foot statuses of the first half of natural turn (a first step to a fourth step);

PREFERRED EMBODIMENTS OF THE INVENTION

Preferred embodiments of the present invention will now be described with reference to the drawings.

Figure 13:
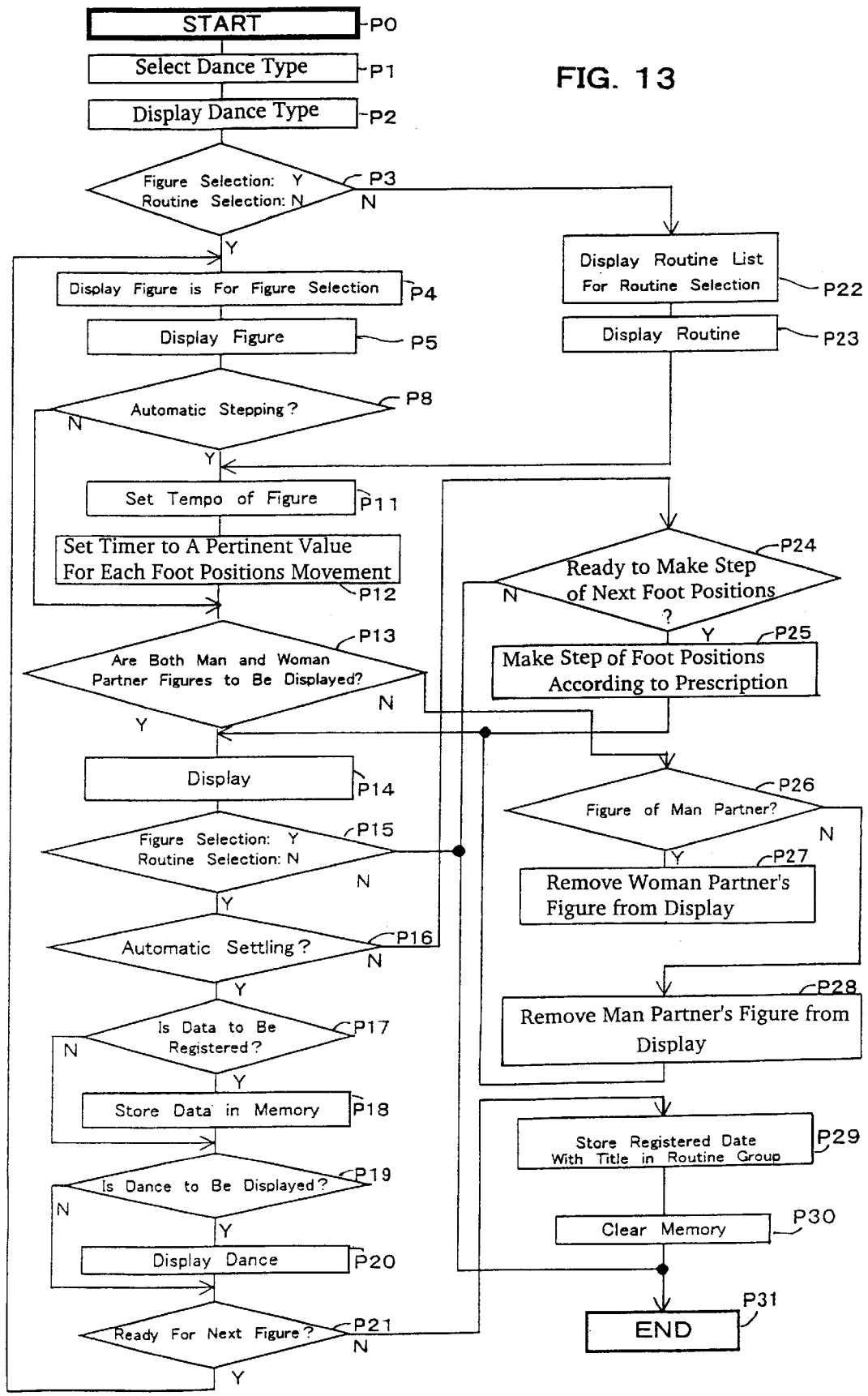
FIG. 13 is a flow chart showing the operation of a progress controller 1 in the first embodiment.

FIG. 1 is a block diagram showing an embodiment of the device according to the invention. FIGS. 3 to 8 are views showing an example of successive displays on a display 6, obtained when selecting blues with a dance mode select switch and selecting quarter turns with a figure select switch in the embodiment shown in FIG. 1. FIG. 13 is a flow chart illustrating the operation in a progress control unit 1 in the embodiment shown in FIG. 1.

The dance training device shown in FIG. 1 comprises a progress controller 1, a mode setter 2, a tempo setter 3, a dance data memory 4, a user data memory 5, a display 6 and a voice output unit 7. The dance data memory 4 includes a foot status memory M1, a finger memory M2, a routine memory M2, a still image memory M4 and a moving image memory M5.

The progress controller 1 includes a microprocessor and a semiconductor memory, and controls the progress of dance training. The semiconductor memory is an internal memory, which includes a RAM and a ROM and stores data inputted to and outputted from the microprocessor. The display 6 is a liquid crystal display, in which data of foot statuses and so forth supplied from the progress controller 1 are displayed on a screen.

The mode setter 2 includes a pointer, such as a track pad or a tracking ball, and a semiconductor memory. In the semiconductor memory a select switch constituted by icones, buttons or a list is stored. The select switches are supplied to and displayed to the display 6 and displayed on the screen thereof. In this embodiment, a track pad is used as the pointer. In the mode setter 2, a dance training mode is accepted by operating the track pad and designation (i.e., clicking) a select branch of the select switch displayed on the screen of the display 6 with the pointer displayed on thereon. The mode setter 2 is a sort of switch, and thus it can also be realized by miniature switches or like hardware switches.

The dance data memory 4 is a semiconductor memory, in which data to be displayed on the screen of the display 6 the dance training, such as foot statuses and figures of dances, or data to be utilized in the progress controller 1 for producing data to be displayed on the screen are preliminarily stored. The hardware of the device shown in FIG. 1 is realized by a notebook type personal computer.

The progress controller 1 reads out dance data from the dance data memory 4 according to the dance training mode set in the mode setter 2, and supplies the read-out dance data to the display 6. The progress controller 1 may also produce dance data by utilizing the dance data read out from the dance data memory 4 and according to the dance training mode set in the mode setter 2. This dance data is again supplied to the display 6.

The mode setter 2 includes dance mode select switches a for selecting different modes of dances to be trained in terms of the name thereof, a figure-routine select switch b for selecting either figure or routine to be displayed on the display 6, figure select switches c for selecting one of a plurality of different figures that is to be displayed, routine select switches d for selecting one of a plurality of routines that is to be displayed, an auto/manual stepping select switch e for selecting either stepping with automatically displayed foot statuses at tempo set in the tempo setter 3 or stepping by manually designating foot statuses for each step, a man partner/woman partner/couple select switch f for selecting either man or woman partner's or couple's foot statuses, a user data store/non-store select switch g for storing or not storing data selected by the user of the device (i.e., trainee) in the user data memory 5, a dance display/non-display select switch h for displaying or not displaying dance, a still/moving image select switch i for selecting either still or moving dance image to be displayed, an optional routine select switch n, a start switch p for starting the function of this embodiment, and an end switch q for ending the function of the embodiment.

FIGS. 3 to 8 show a sequence of foot status images successively displayed on the screen of the display 6 when blues is selected with the dance mode select switch a, figure is selected with the figure/routine select switch b, quarter turns is selected with the corresponding figure select switch c, automatic stepping is selected with the auto/manual stepping select switch e, couple is selected with the man/ woman/couple select switch of and dance display/non-display select switch h. In FIG. 4, the oval shape represents the body and weak foot status image not blackened represents a status where his/her foot is placed on the floor without loading his/her weight to the floor.

In FIGS. 3 to 8, the foot statuses of the man partner are designated by reference symbols including F, and those of the woman partner are designated by reference symbols including f. Numeral figures attached to F and f represent the sequential numbers of the steps. The reference symbols F1, F2, ... and f1, f2, ... are not actually displayed on the screen of the display 6, but are given in the Figures for the sake of facilitating the understanding the sequence of the foot statuses displayed on the screen of the display 6 and the discrimination between the man and women partner's foot statuses. The black areas of the man partner's foot statuses represent portions in contact with the floor. The shaded areas of the woman partner's foot statuses show portions in contact with the floor. The L.O.D is parallel to the upper edge of the screen.

In FIGS. 3 to 8, views labeled A to X show images which are displayed in a foot status display area of the screen. In a left side narrow area of the screen. Select switches constituted by icons or buttons corresponding to title bars or tool bars in an operating system manufactured by Microsoft Co., Ltd. are always displayed. The foot status display area is a main display area of the screen.

The figure of quarter turns in blues is started with the foot status image A in FIG. 3. Referring to the foot status of the Man partner, in the image A in FIG. 3 (at the time of the start) one of the left and right feet is in flat contact with the floor and another foot is placed on the floor without loading his/her weight to the floor. In the next image B in FIG. 3, the left foot has been stepped ahead. At this time, in the foot status F1 the heel is not in contact with the floor, and in the foot status F2 the heel is in contact with the floor. In the image C in FIG. 3, in the foot status F1 only the tow is in contact with the floor, and in the foot status F2 the bawl is in contact with the floor. In the image D in FIG. 3, only the left foot is in flat contact with the floor, and the right foot is entirely out of contact with the floor. In the image E in FIG. 4, in the foot status F2 the heel is not in contact with the floor, and in the foot status F3 the heel is in contact with the floor. The heel, bawl and tow represent areas bearing the weight, and are not always in contact with the floor. For example, although in the image C in FIG. 3 in the foot status F2 the bawl is shown to be in contact with the floor, but actually in the foot status F2 not only the bawl but also the tow is in contact with the floor. However, in the foot status F2 the tow does not bear the weight.

Although in the image E in FIG. 4, the trace of the right foot moved from the foot status F1 to the foot status F3 is shown by arrows, in the actual image not arrow indicating the trace of movement is shown. The movement of the foot can be understood without any arrow display, and the arrow display is thus omitted to avoid complication of the image. Of course it is possible to cause display the trace of movement with the arrows as shown. When the auto/manual stepping select switch e is automatically set, the images A to X in FIGS. 3 to 8 are automatically displayed successively at a rate determined by a tempo signal supplied form the tempo setter 3. That is, the figure steps automatically proceed in the order of the images A to X in FIG. 3 to 8. The trainee continuously observing the images A to E in FIGS. 3 and 4 can intuitively understand the trace of the right foot just like moving image is observed without any arrow display. The reference symbols F1, F2, F3, ... and f1, f2, f3, ... are also not displayed to avoid complications of the images.

As described before, by setting the auto/manual stepping select switch e to automatic, the foot status images A to X in FIGS. 3 to 8 can be automatically displayed successively at a rate determined by the tempo signal supplied form the tempo setter 3.

In the foot status memory M1, foot status patterns of the heel, bawl, tow and flat are stored for the left and right feet. In the figure memory M2 one or a plurality of figures are stored as foot status data of the figure or figures for each dance mode. For example, the foot status data of a figure may be that of quarter turns of blues. This foot status data includes the center positions of the feet in the figure, the L.O.C. the foot orientation with respect to the L.O.C. for each of the center positions of the feet, and the distinctions of the heel, bawl, tow and flat.

The progress controller 1 reads out the foot status data of the figure selected by the figure select switch c from the figure memory M2, reads out the foot status pattern of the heel, bawl or tow from the foot status memory M1 in dependence on the discrimination of the heel, bawl, tow or flat of foot in each step in the foot status data, and disposes each foot status pattern at the center position of each step foot in the foot status data and also in accordance with the orientation of the foot. In this way, the progress controller 1 generates, for each step, foot status data defined by the foot status pattern of either heel, bawl, tow or flat, the center position of the foot and the orientation of the foot.

In the foot status images A to X in FIGS. 3 to 8 displayed on the screen, the present foot statuses are shown by solid lines, and the succeeding step foot statuses are shown by broken lines. This distinction by the solid and broken lines may be replaced by one by different colors. The L.O.D. may be displayed on the screen, or it is sufficient to describe in a manual or the like that the upper edge of the screen is the L.O.D.

As shown in FIGS. 4 to 8, in this embodiment of the device it is possible to display foot statuses on the screen of the display 6 for each step and with the distinctions of the heel, bawl, tow and flat. The trainee carrying the device thus can very readily visually recognize and understand foot statuses of figures by watching the screen of the display 6. In the training of foot statuses, the tempo of the stepping is set in the tempo setter, and thus it can be selected as desired to suit the attained skilled level. A beginner can reliably master the foot status of each step by selecting the auto/manual stepping select switch to manual and displaying the foot status images A to X in FIGS. 3 to 8 successively on the screen of the display 6 every time the manual stepping button provided in the tempo setter 3 is depressed.

The twenty three foot status images A to X in FIGS. 3 to 8 are displayed on the screen of the display 6 of the embodiment of the device by an operation shown in the flow of FIG. 13.

In step P1, a plurality of icons are displayed as the dance kind select switches a on the screen of the display 6. The dance modes are shown by characters under the icons. The trainee designates (or clicks) an icon corresponding to a dance mode to be trained with a pointer, which is moved on the screen by operating the track pad in the mode setter 2. As a result, the designated dance mode is displayed on the screen in a step P2.

In a step P3, Y represents that figure is selected by the figure/routine select switch b. In this case, a list of figures as the figure select switches c is displayed on the screen in a step P4. The trainee watching the list designates a figure to be trained by operating the track pad. As a result, the foot statuses of the designated figure are displayed in a step P5.

The trainee then sets the auto/manual stepping select switch to automatic. As a result, the progress controller sets the tempo of the figure in a step P11, and sets a clock frequency of an internal timer corresponding to the set tempo.

Then, by setting the man/woman/couple select switch f to, for instance, couple in a step P1, a course Y is set, and images corresponding to the dance mode selected by one of the select switches in the mode setter 2 are displayed on the screen in a step P14. When blues and quarter turns as a figure have been selected in the steps P1 and P4, respectively, the foot status image A in FIG. 3 is displayed on the screen. At this time, when the auto/manual stepping select switch has been set to automatic in the step P8, the foot status images A to X shown in FIGS. 3 to 8 are automatically displayed successively at a fixed tempo on the screen. The fixed tempo has been set in the tempo setter 3.

In a step P15, what has been checked in the step P3 is checked again. When routine has been selected, an end is brought to the operation in a step P31. What has been checked in the step P8 is checked again in the step P16. When automatic has not been set, steps P24 and P25 are executed, in which the foot status images A to X in FIGS. 3 to 8 are displayed on the screen one after another whenever the trainee depresses a progress button in the temp setter 3.

In a step P17, the user data storage/non-storage switch g is checked. When the switch g has been set to storage, a step P18 is executed, in which the set history selected by the select switch in the mode setter 2 is stored as figure history data in a figure group are in the user data memory 5. The figure history data includes the kind of figure selected in the step P4 and the foot status data supplied to the display 6 in the step P14.

In a step P19 the dance display/non-display select switch h is checked. When the switch h has been set to display, a step P20 is executed, in which still or moving image representing the figure selected in the step P5 is read out from the still or moving image memory M4 or M5 and displayed on the screen. Whether still or moving image is displayed, depends on the setting of the still/moving image select switch i. The progress controller 1 reads out images to be displayed from the still or moving image memory M4 or M5 in timed relation to the progress of the foot status images, generates superimposed images by superimposing the foot status images and still or moving images on one another, and supplies the generated images of the display 6. The still or moving images may be obtained by actually photographing a dancing couple or animation images.

Figure 8:
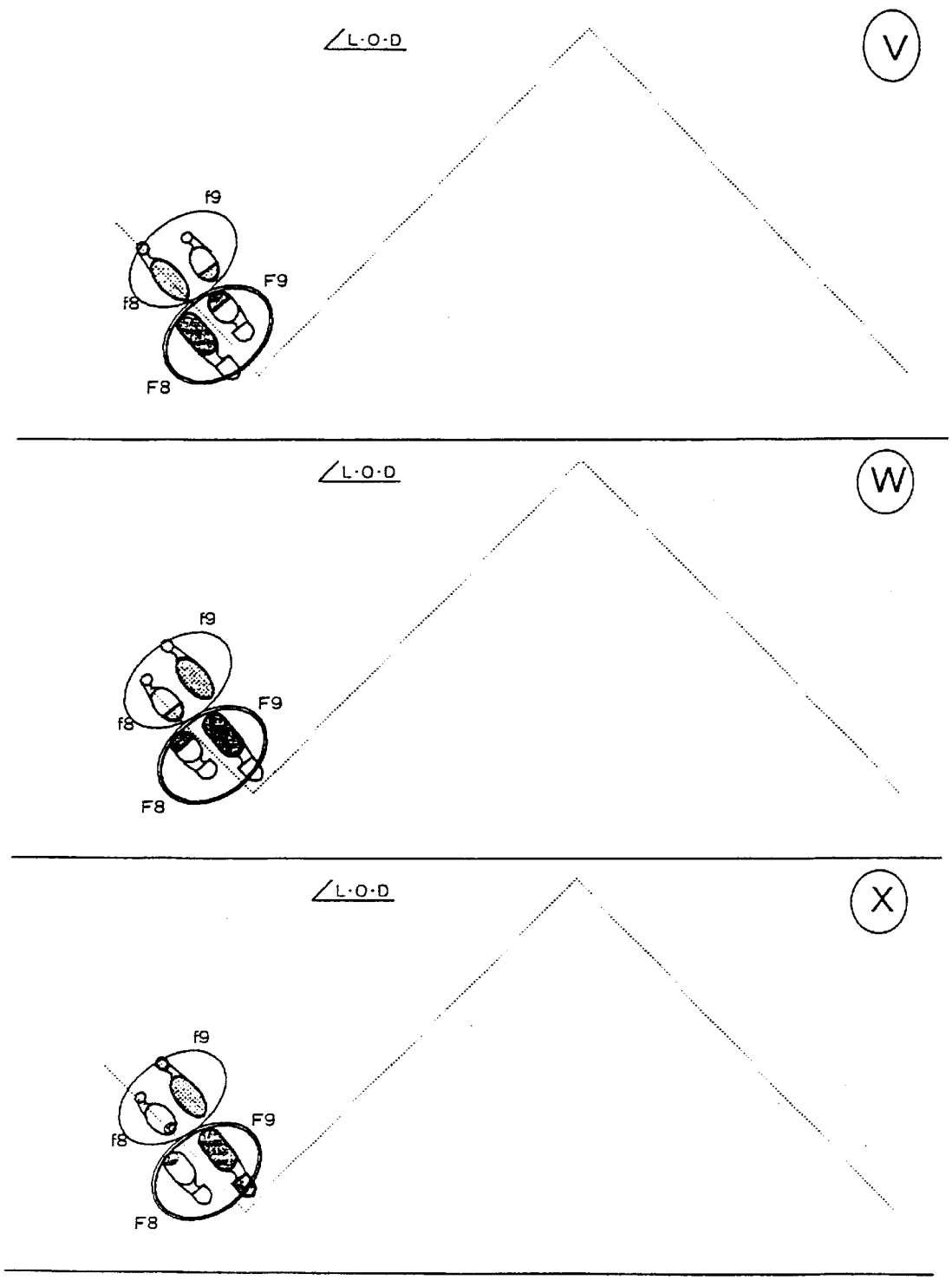
FIG. 8 is a view showing a foot status images sequentially displayed subsequent to the images shown in FIG. 7 in the case of the selection of blues with the dance mode select switch and the selection of quarter turns with the figure select switch.

When the sequential foot status image display of the figure of quarter turns has been proceeded up to the image X in FIG. 8, a step P21 is executed, in which the progress controller 1 holds the displayed image X in FIG. 8 and checks whether a figure select switch c has been newly selected. When it is found that the switch c has been selected, the operation returns to the step P4. When it is found that the end select switch q has been selected, a step P29 is executed, in which the figure history data stored in the figure group area of the user data memory 5 is stored in the routine group area thereof.

While the operation returns to the step P4 in response to the new selection of the figure select switch c, the figure list displayed in the step P4 at this time is constituted by figures which are suited to be connected to the figure displayed in the step P14, and figures unsuited to be connected has been excluded from the list. Since the figure displayed in the preceding step P14 is quarter turns. An example of the figure suited to be connected at this time is side chasse to right shown in AA in FIG. 10, or the first half of natural turn (a first step to a fourth step) shown in AB. However, the figures shown in FIG. 10 are examples of the foot status views provided in the conventional dance guide book, and foot status views displayed in this embodiment are simplified such as those shown in FIGS. 3 to 8 as described before. As shown, in this embodiment suited figure candidates are automatically shown, and it is thus possible to greatly alleviate the mental burden of the beginner in the training and help the trainee to train dance while feeling enjoyment.

While the data stored in the routine group area of the user data memory 5 is of the figure having been selected in the step P4, since a figure is selected in one cycle of steps P4 through P21 and another figure is selected in the next cycle of these steps, the data of these figures may be said to be continuous data, i.e., routine data. The routine data stored in the routine group area is peculiar to the trainee, and like ready-made routine data stored in the still image memory M4 it can be read out at any time or display on the display 6 and train the routine peculiar to the trainee. The trainee thus can readily repeat a training procedure which is most efficient for improving his or her skilled level of dancing. Even a person with a considerably skilled level can not readily form a routine by combining suited figures. This embodiment, however, permits formation of a suitable routine while the trainee is training figures.

In a step P30, the figure group area of the user data memory 5 is cleared to be ready for figure history data to be selected in the next training.

Figure 9:
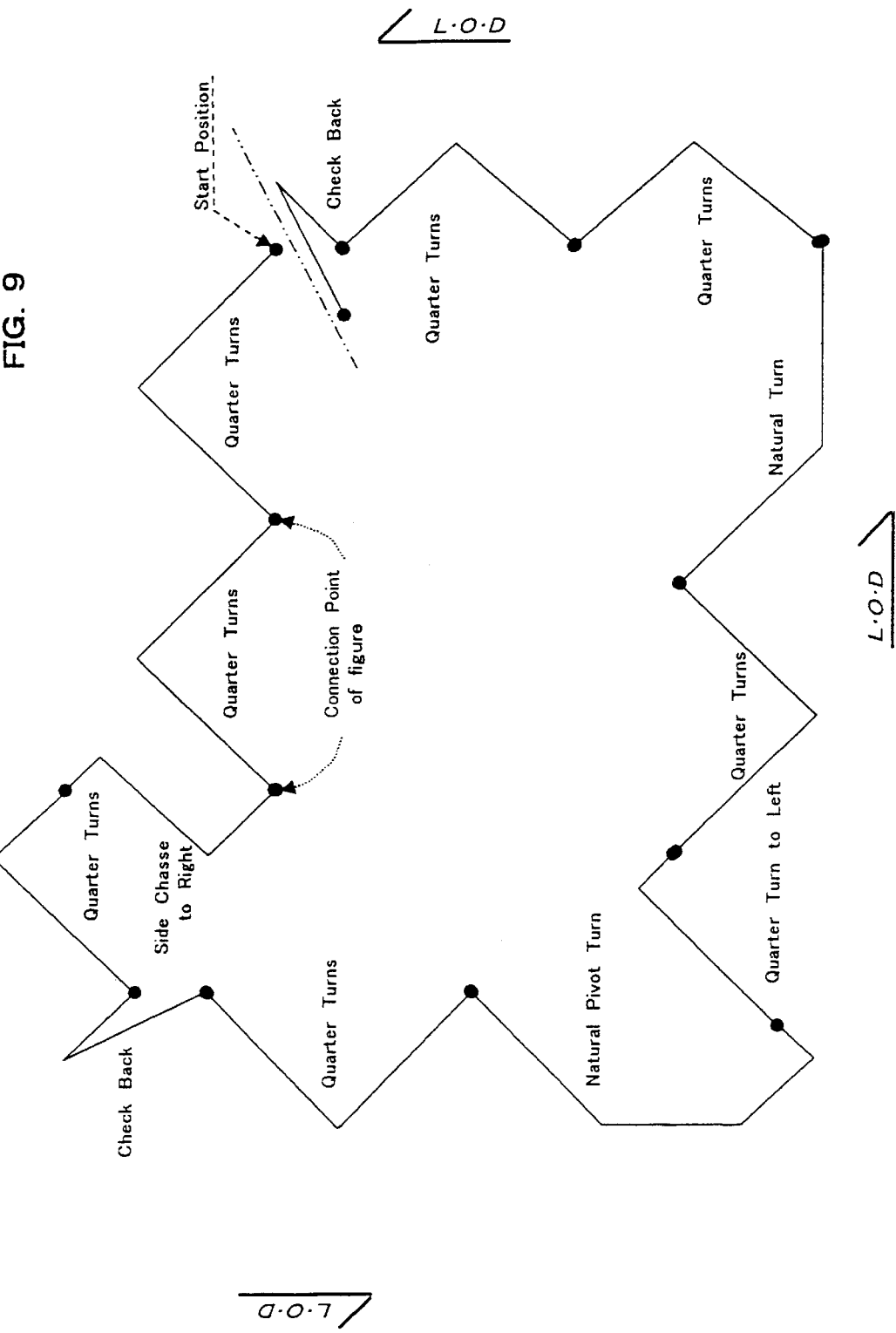
FIG. 9 is a view showing an example of routine displayed on the display 6 of the first embodiment in the case of selection of glues with the dance mode select switch and selection of routine with a figure/routine select switch.

When N course is selected in the previous step P3, it is meant that routine has been selected by the figure/routine select switch b. In the routine memory M3, at least one routine is stored for each dance mode in the form of the trace to be followed by the trainee. When routine is selected by the figure/routine select switch b, N course is selected in the step P3, and a step P22 is executed. In the step P22, the routine list is selected from the routine memory M3, and a desired routine is selected by the corresponding routine select switch d. In a subsequent step P23, the selected routine, for instance the routine shown in FIG. 9, is read out from the routine memory M3 and displayed on the screen of the display 6.

When the optional routine select switch n is selected in lieu of the routine select switch d in the step P22, the routine data stored in the routine group are in the user data memory 5 is read out in the step P23, and is processed for display on the screen like the ready-made routine data read out from the routine memory M3.

The selection of N course in the step P13 in the flow chart of FIG. 13, means that either a man or a women partner has been selected by the man/woman/couple select switch f. In this case, a step P26 is executed, in which whether the man partner has been selected is checked. When the man partner has been selected, the woman partner's figure is made to be out of display in a step P27, before the operation is returned to the step P14. When it is found in the step P26 the man partner has not been selected, a step P28 is executed, in which the man partner's figure is made to be out of display, before the operation returns to the step P14.

Figure 12:
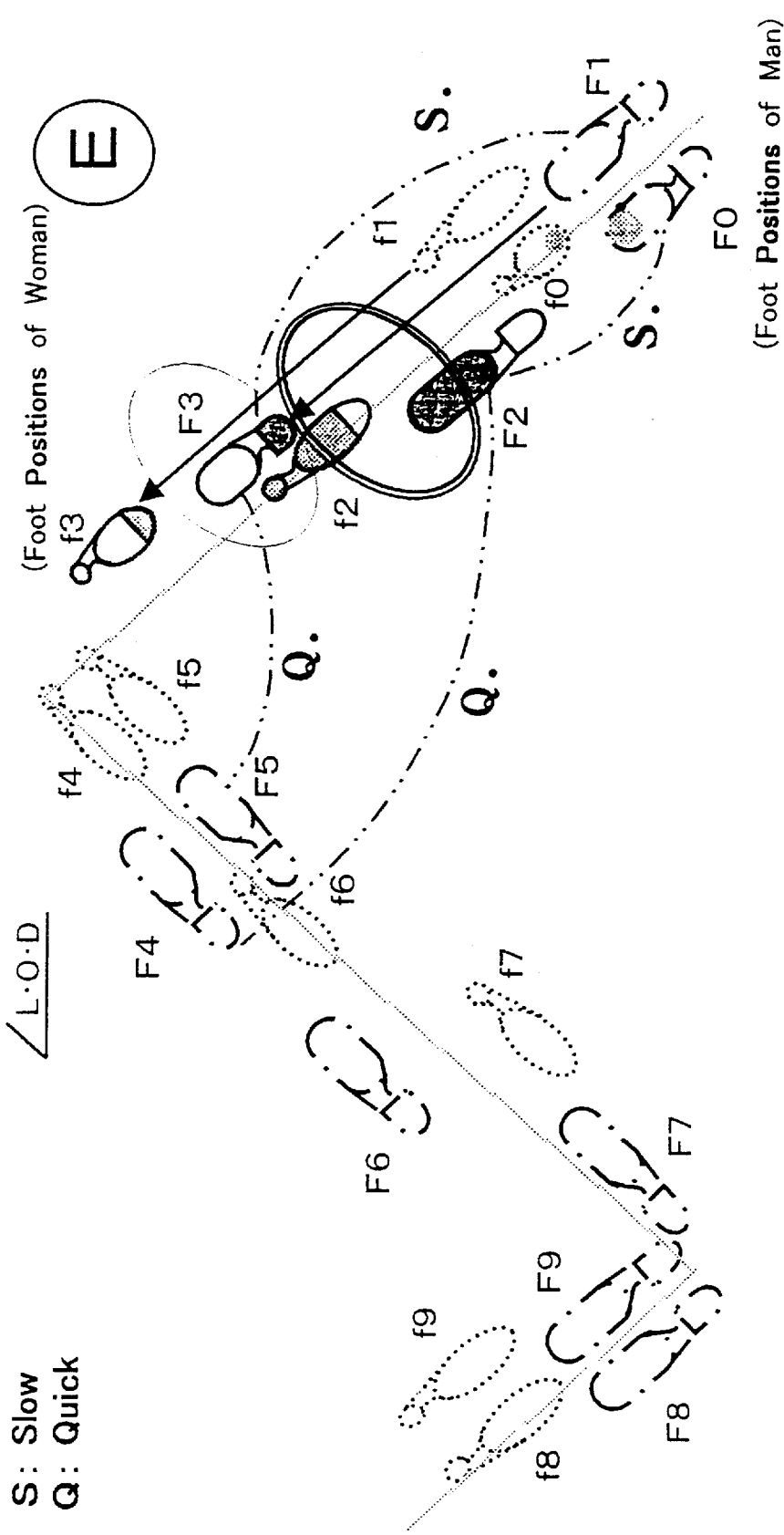
FIG. 12 is a view showing a foot status display example in the case of modifying the foot status image E in FIG. 4 by adding step count symbols Q and Q.

The construction and function of the first embodiment of the dance training device according to the invention has been described in detail with reference to FIGS. 1, 3 to 9 and 13. FIG. 12 shows a copy of the foot status image E in FIG. 4 drawn on a paper sheet. In the Figure, the trace of movement of the foot statuses and count symbols S and Q attached to the trace are shown. For displaying the foot status view shown in FIG. 12, the trace and the count symbols are stored as part of the foot status pattern in the foot status memory Ml, and are red out and displayed on the display 6 together with the foot status pattern. However, the foot status view is complicated by displaying the trace and the count symbols. For this reason, it may be adapted that the trace and the count symbols may be made to be out of display as desired. It is possible to use numerals 1, 2 and 3 in lieu of the count symbols S and Q. The count symbols 1, 2 and 3 belong to waltz, for instance. This selection may be realized by additionally providing a trace/count symbol display/non-display select switch in the mode setter 2 shown in FIG. 1. With the provision of this additional switch, at the time of reading a foot status pattern from the foot status memory M1, the progress controller 1 selects either "read" or "non-read" of the trace and count symbols according to the setting of the trace/cont symbol display/non-display select switch.

Figure 11:
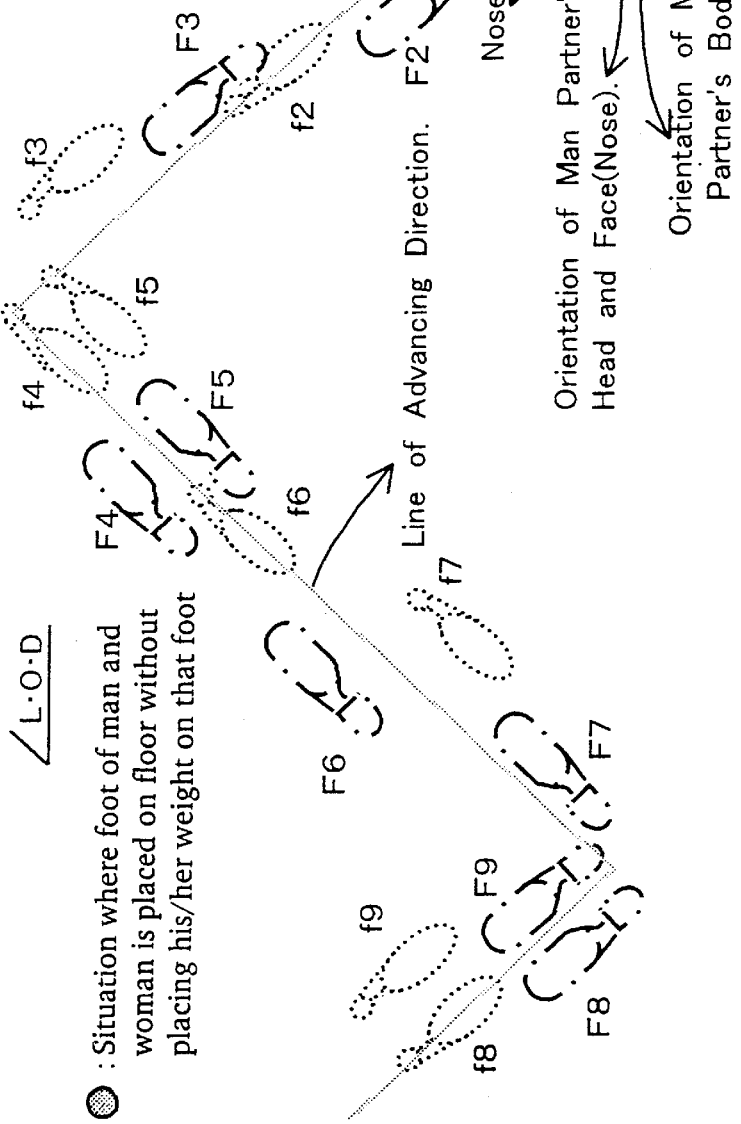
FIG. 11 is a view showing an example of foot statuses sequentially displayed on the display 6 of a second embodiment in the case of selection of blues with the dance mode select switch, selection of quarter turns with the figure select switch and selection of body display/non-display select switch.
Figure 14:
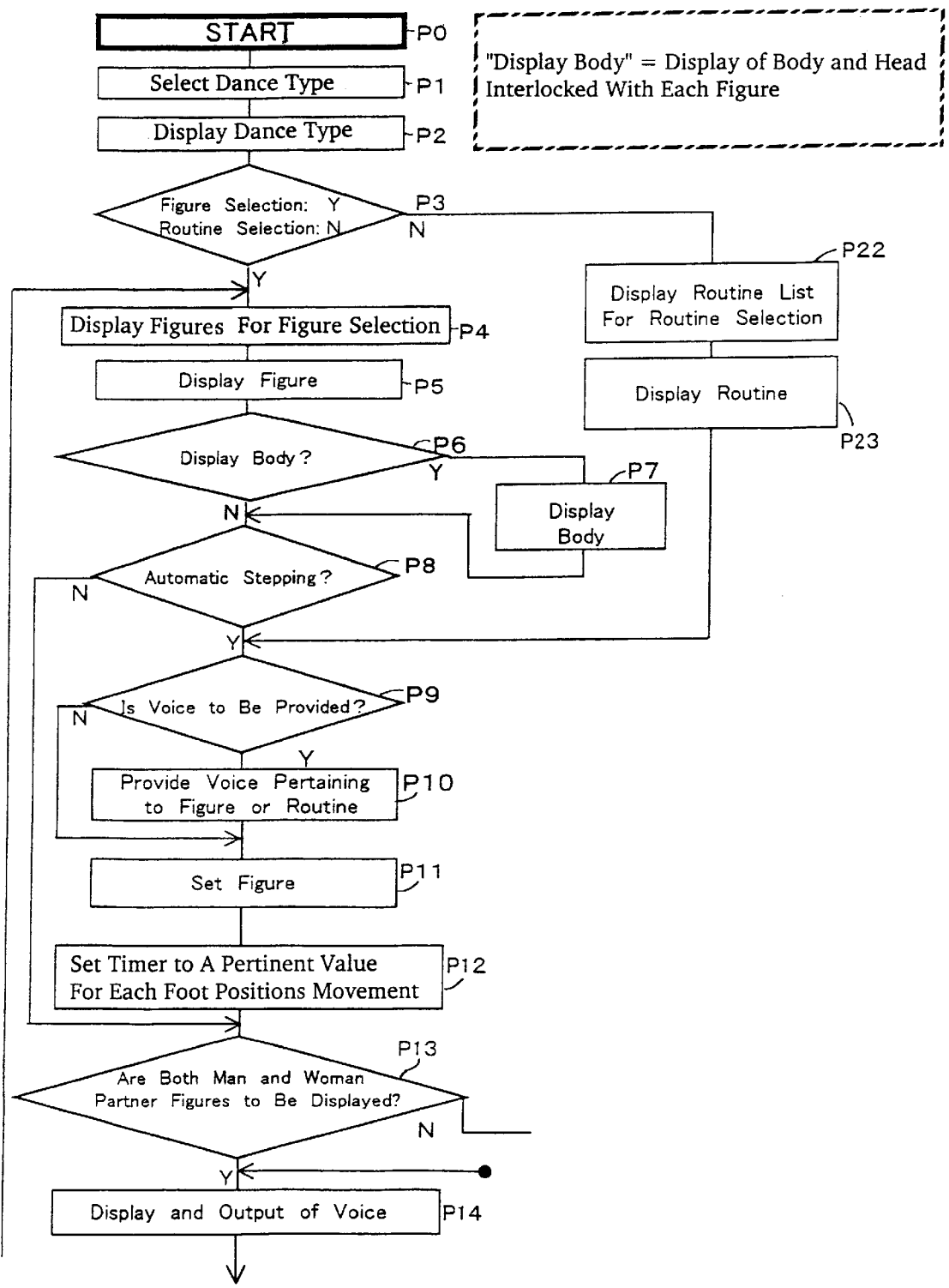
FIG. 14 is a flow chart showing an operation part added to the flow chart of FIG. 13 that is executed in the progress controller 1 in the second embodiment.

FIG. 2 is a view showing a second embodiment of the dance training device according to the invention. FIG. 11 is a view showing an example of foot status image displayed on the display 6 of this embodiment. FIG. 14 shows an essential part of the flow chart of the operation of the progress controller 1 in the second embodiment. The flow chart of FIG. 14 is used in lieu of part of the flow chart of FIG. 13 in the first embodiment. In the flow chart of FIG. 14, steps P6, P7, P9 and P10 are added to the flow chart shown in FIG. 13. In the step 14, as function of providing voice is added to the function of image display in the step P14 shown in FIG. 13. Thus, in the second embodiment the same functions are the same as those in the first embodiment, and additional functions are provided.

Referring to FIG. 2, the mode setter 2 includes a body display/non-display select switch j, a voice/non-voice select switch k and a voice/comment select switch, these switches being provided in addition to the structure shown in FIG. 1. The dance data memory 4 includes a body orientation memory M6, a head position memory M7, a head orientation memory M8, a music memory M9 and an instruction memory M10, these memories being provided in addition to the structure shown in FIG. 1.

FIG. 11 shows a foot status image displayed in the second embodiment. In the image, the orientation of bodies, the orientation of heads and faces and noses are shown. The block line ovals each substantially enclosing the left and right foot statuses, are abstract plan view representations of the bodies standing on the floor. The bold line circles within the body representations are abstract plan representations of the heads, and the triangles attached to the head representations represent the noses. Thus, the image shows not only the pure foot statuses but also has representation of the bodies, heads and noises, and the trainee can learn important elements of the whole body that are necessary for beautiful or smooth dancing.

To enable the display of the representations of the bodies, heads and noises in addition to the foot status views shown in the first embodiment, the embodiment shown in FIG. 2 features the following elements in addition to the structure shown in FIG. 1.

Body representation ovals of 24 orientations one different by 15 degrees C from the next one are stored in the body orientation memory M6. The center positions of the body representation circles are stored in the head position memory M7 such that they are located on the center, the left side and the right side of the body representations. Eight patterns of heads with noses are stored in the head position memory M2 such that they correspond to 24 head orientations one different by 15 degrees C from the next one. The progress controller 1 reads out foot status data from the figure memory M2, and designates foot status patterns to be read out from the foot status memory M1 according to the foot status data. In order to be able to designate the body orientation, the head position and the head orientation in the foot status pattern reading, data of the body orientation, the head position and the head orientation are in the foot status data in addition to the foot status patterns.

Referring to FIG. 14, subsequent to the state P5 of the figure display, a step P6 of checking whether bodies are to be displayed is provided. When the body display/non-display select switch j has been set to display, Y course is selected in the step P6, and the representations as shown in FIG. 11, for instance, are displayed. For the rest, the display is the same as in the foot status images shown in FIGS. 3 to 8.

In the music memory M9, dance music is stored, and instructions useful for the dance training are stored in the instruction memory M10. When the voice/non-voice select switch k has been set to voice and the music/instruction select switch m has been set to music, dance music is provided from the voice output unit 7 in steps P9 and P10. Dance music is read out from the musical memory M9 in the same manner as when moving image is read out from the moving image memory M5. When the voice/non-voice select switch k has been set to voice and the music/ instruction select switch m has been set to instruction, instructions are provided from the voice output unit 7 in the steps P9 and P10. Instructions are read out from the instruction memory M10 in the same manner as when moving image is red out from the moving image memory M5.

The foot status views shown in FIGS. 3 to 8 and 10 to 12 are provided with a preamble that the L.O.D. is parallel to the upper edge of the screen. However, according to the invention the L.O.D. may not be parallel to the upper edge of the screen. As shown in FIG. 9, the L.O.D. is changed as the proceeds on the floor. The orientation of the trainee is changed whenever he or she makes a step. That is, with the L.O.D. made parallel with any side of the display screen, the trainer should make training while always paying attention to and confirming the angular relation between his or her present position and the L.O.D. because the angle between his or her orientation and the L.O.D. is not fixed.

By assembling gyro in the dance training device, the progress controller 1 can always grasp or obtain the orientation of the device. In this case, a fixed orientation of the foot status image, for instance the L.O.D., can be displayed on the display screen such that it is always in the same orientation as the orientation of the device (substantially identical with the orientation of the trainee). The orientation of the device casing is detected by the gyro, and the foot status image data is rotated such as to make the device orientation to be identical with the L.O.D. before the foot status image data is supplied to the display.

In the above embodiment, the casing of the dance training device was of notebook type. However, this is by no means limitative, and the casing may be of any size and shape so long as it can be conveniently carried. For example, a casing of A5 or B5 type can be conveniently carried and provide a screen of a size convenient to watch. Furthermore, it is possible to employ a foldable casing such as that of a notebook type personal computer or a single rectangular plate type casing.

In the foot status views in FIGS. 3 to 8, the foot statuses preceding and succeeding the present ones were drawn by broken lines, the preceding foot statuses may be omitted. In addition, the succeeding foot statuses may be shown in different color from a color of the present ones. Of course it is possible to display the preceding foot statuses in a color distinct from colors of the present and succeeding foot statuses.

The display is not limited to the liquid crystal display; for instance, it is possible to employ a plasma display or a CRT, or a display device of a type of projecting image onto dance hall walls. Furthermore, by permitting color display of images and characters on the display and providing distinction of the man and woman partners in different colors, it is possible to provide display which can be more conveniently watched, more intimate and more beautiful.

As has been described in connection with the embodiments, the invention can provide the following effects.

(1) The foot statuses of the present step can be displayed with an emphasis such that they are distinguished in line thickness or color from the foot statuses of preceding and succeeding steps. Thus, the trainee training dance while watching the screen of the device according to the invention carried by him or her can immediately understand the step to be made right now. Thus, the device according to the invention permits dance training without substantial need of concentrating attention for understanding foot statuses but by concentrating nerve on the grasped foot statuses, thus extremely improving the training efficiency.

(2) Since the sole foot statuses of the step to be made right now can be displayed with an emphasis, the foot statuses of both the man and woman partners can be displayed at a time without complicating the image. Thus, the trainee, either man or woman, training dance while watching both the man and woman partner's foot statuses displayed at a time on the display screen of the dance training device according to the invention carried by him or her, can think out how to obtain the most suitable action of himself or herself by readily grasping the position relation to and movement of the partner.

(3) Since only the man or woman partner's images can be selectively displayed as desired, the beginner can readily understand foot statuses and, when the skilled level has been somewhat advanced, can select the display of both the man and woman's images at a time. The switching of the display can be done by a simple switch operation.

(4) The manner of the contact of the feet on the floor in the foot statuses can be displayed with the distinction of the heel, bawl, tow and flat from one another, and it is thus possible to permit ready understanding of the movement of the weight.

(5) After a figure has been ended, next figure candidates suited for selection are displayed. Thus, even a trainee without substantial intelligence of dancing can select suited figures one after another and naturally form a routine by combining the successively selected figures.

Even the beginner thus can readily form a suited routine.

(6) Since only the foot statuses of the step to be made right now can be displayed with an emphasis, the orientations of the bodies and faces and the positions of the heads can be displayed together with the foot statuses without complicating the image. With the display of the orientations of the bodies and faces and the positions of the heads together with the foot statuses, dance data required at a high level can be displayed such that they are convenient to watch.

(7) Since still or moving images of actually dancing partners can be displayed in an interlocked relation to foot statuses, even complicated figures can be displayed such that they can be readily understood intuitively.

(8) Since dance music or instructions related to the dance can be provided in an interlocked relation to the foot status display, it is possible to train dance in a timed relation to the music or listen to instructions useful for the training. Thus, it is possible to further improve the training efficiency.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A dance instruction device comprising:

a progress controller including a microprocessor and a memory for inputting and outputting data from and to the microprocessor for controlling dance instruction;

a display constituted by a liquid crystal display screen for displaying foot position data supplied from the progress controller;

a mode setter including means for indicating a plurality of dance instruction selection options, means for generating a pointer for indicating a selection, and manual input means for manually inputting an indicated selection; and a dance data memory constituted by a semiconductor memory for storing data of foot positions or figure data to be displayed for dance instruction on the screen or data for generating information to be displayed on the screen in the progress controller, wherein the progress controller reads data from the dance data memory according to a dance instruction mode set in the mode setter, and supplies the data read from the dance data memory or the information generated from the data read from the dance data memory to the display.

2. The dance instruction device according to claim 1, wherein:

the mode setter includes a man/woman selection means for selecting data of either a man or a woman partner to be displayed on the display; and data of the man and woman partners are stored in the dance data memory.

3. The dance instruction device according to claim 2, wherein the man/woman selection means includes a first secondary selection path for selecting data of either the man or woman partner to be displayed on the display and a second secondary selection path for displaying the data of both the man and woman partners.

4. The dance instruction device according to claim 1, wherein:

the mode setter includes a dance type selection means for selecting a dance type and figure selection means for selecting figures corresponding the selected dance type, each figure comprised of a series of steps;

the dance data memory includes a foot position memory for storing foot positions corresponding to the steps in each figure and a figure memory for storing the selected figures;

the foot positions include heel, ball, toe and flat patterns for the left and right feet and are stored in the foot position memory;

one or a plurality of figures are stored as foot position data for each dance type in the figure memory;

the foot position data includes a foot center for each step in each figure and a foot orientation with respect to a line of dance for each step of each figure; and the progress controller reads foot position data for a figure selected by the figure selection means, distinguishes between the heel, ball, toe and flat patterns in each foot position, and supplies the foot position patterns according to the foot centers and the foot orientations to the display.

5. The dance instruction device according to claim 1, wherein:

the mode setter includes a routine selection means for selecting a routine corresponding to the selected dance type;

the dance data memory includes a routine memory area for storing the routine in the form of a trace to be followed by a trainee;

at least one routine is stored for each dance type in the routine memory; and the progress controller executes the routine selected by the routine selecting means from the routine memory area and supplies the selected routine to the display.

6. The dance instruction device according to claim 4, wherein:

the progress controller reads from the figure memory, after a previous figure shown on the display has ended, a next selected figure suitable for following the ended figure for display on the display, and supplies, when the next suitable figure is displayed on the display, foot position data of the selected suitable figure to the display; and when no next suitable figure has been selected by the figure selecting means, the progress controller reads from the figure memory a figure other than the ended figure which is suitable for following the ended figure for display.

7. The dance instruction device according to claim 4, wherein:

the dance data memory includes an image memory area for storing at least a still or moving image obtained by photographing dancing partners performing a dance maneuver according to a figure stored in the figure memory; and the progress controller reads the figure from the figure memory and, in a timed relation to the display of the foot position data of the figure on the display, reads the image from the image memory area and supplies the read image to the display.

8. The dance instruction device according to claim 4, wherein:

the dance data memory includes a body orientation memory area for storing body orientation information of dancing partners performing a dance maneuver according to a figure stored in the figure memory; and the progress controller reads, in a timed relation to a reading the figure from the figure memory and outputting the foot position data of the read figure, the body orientations from the body orientation memory area for being supplied to the display.

9. The dance instruction device according to claim 8, wherein:

the dance data memory includes a head position memory area in which head positions of dancing partners performing a dance maneuver according to a figure stored in the figure memory are stored in relation to the body orientations; and the progress controller reads, in a timed relation to the reading of the figure from the figure memory and outputting the read figure to the display, the head positions from the head position memory area for being supplied to the display.

10. The dance instruction device according to claim 9, wherein:

the dance data memory includes a face orientation memory area in which orientations of the faces of dancing partners performing a dance maneuver according to a figure stored in the figure memory are stored in relation to the head positions; and the progress controller reads, a timed relation to the reading of the figure from the figure memory and outputting the foot position data of the read figure to the display, the face orientations from the face orientation memory area for being supplied to the display.

11. The dance instruction device according to claim 4, further comprising a voice outputting unit which receives a voice signal from the progress controller and outputs the voice signal, wherein:

the dance data memory includes an instruction memory area, in which instructions to be given to a trainee are stored in correspondence to the figures stored in the figure memory; and the progress controller reads, a timed relation to a reading of a figure from the figure memory and outputting the read figure to the display, a voice signal providing an instruction from the instruction memory area for being supplied to the voice output unit.

12. The dance instruction device according to claim 6, further comprising a user data memory, from which data can be read when desired according to the user's instruction, wherein:

the progress controller causes a next selected figure selected by the figure selecting means to follow the ended figure, and also the ended figure to be stored automatically in at least the user data memory, and successively reads the ended figure and the next selected figure from the user data memory when desired according to the user's instruction for supplying the read figures to the display.

13. The dance instruction device according to claim 4, further comprising a laser gyro for detecting an angle of the screen of the display with respect to a predetermined direction, wherein:

the progress controller adjusts the foot orientations of the foot position data according to the angle detected by the gyro, thereby generating adjusted foot positions according to the line of dance, and supplying the adjusted foot positions to the display.

14. The dance instruction device according to claim 4, further comprising a tempo setter for manually receiving a tempo corresponding to a speed of change of foot positions, wherein:

the mode setter includes an auto/manual stepping selecting means for selecting between an automatic stepping mode in which foot position data are automatically generated and outputted for each step at the speed corresponding to the tempo, and a manual mode in which foot position data is generated and outputted for each step whenever an instruction is manually given; and the progress controller automatically generates and supplies foot position data for each step at the speed corresponding to the tempo when the automatic stepping mode has been selected by the auto/manual stepping selecting means, and generates and supplies foot position data for each step whenever an instruction is manually given when the manual stepping mode has been selected by the auto/manual stepping selecting means.

* * * * *